United States Patent [19]

Bicht et al.

[11] 4,085,945
[45] Apr. 25, 1978

[54] VEHICLE SUSPENSION SYSTEM

[75] Inventors: John Richard Bicht, Hemel Hempstead; Peter Stuart Warner, Henlow, both of England

[73] Assignee: Lucas Industries Limited, Birmingham, England

[21] Appl. No.: 724,672

[22] Filed: Sep. 20, 1976

[30] Foreign Application Priority Data

Oct. 3, 1975 United Kingdom ............... 40484/75

[51] Int. Cl.² ............................................. B60G 11/16
[52] U.S. Cl. ......................... 280/106.5 R; 267/20 R; 280/724
[58] Field of Search ................ 280/106.5 R, 688, 693, 280/695, 702, 723, 724; 267/20 R, 57, 60

[56] References Cited

U.S. PATENT DOCUMENTS

| 2,162,843 | 6/1939 | Erickson | 280/106.5 R |
| 2,253,217 | 8/1941 | Wenthe | 280/106.5 R |
| 2,822,186 | 2/1958 | Lires | 280/106.5 R |
| 3,615,103 | 10/1971 | Dohring | 280/723 |
| 3,735,999 | 5/1973 | Blackledge | 280/693 |
| 3,944,245 | 3/1976 | Kuhn | 280/106.5 R |

FOREIGN PATENT DOCUMENTS

| 831,284 | 8/1938 | France. |
| 1,959,237 | 6/1971 | Germany. |

Primary Examiner—Joseph F. Peters, Jr.
Assistant Examiner—John A. Carroll
Attorney, Agent, or Firm—Ladas, Parry, Von Gehr, Goldsmith & Deschamps

[57] ABSTRACT

A suspension system for a pair of vehicle wheels comprising a pair of arms, ends of which are pivoted to a frame of the vehicle, the carrying wheel hubs, the free ends the arms remote from the pivots being connected together across the vehicle by a member incorporating a single pivotal joint.

2 Claims, 3 Drawing Figures

VEHICLE SUSPENSION SYSTEM

This invention relates to a suspension system for a pair of wheels of a vehicle. In particular, though not exclusively the invention is applicable to an electrically driven vehicle which has a battery pack containing a plurality of electrical storage batteries providing a source of power for the electrical drive of the vehicle. Such a battery pack takes up a large space, leaving correspondingly smaller spaces than usual for such components as the wheel suspension, if the vehicle is not to be inordinately large.

It is an object of this invention to provide a suspension system for a pair of vehicle wheels in a simple but effective form.

In accordance with the present invention a suspension system for a pair of vehicle wheels comprises a pair of arms, ends of which are pivoted to a frame of the vehicle and respectively carrying the wheel hubs, the free ends of the arms remote from the pivots being connected together across the vehicle by a member incorporating a single pivotal joint.

Figure 1:
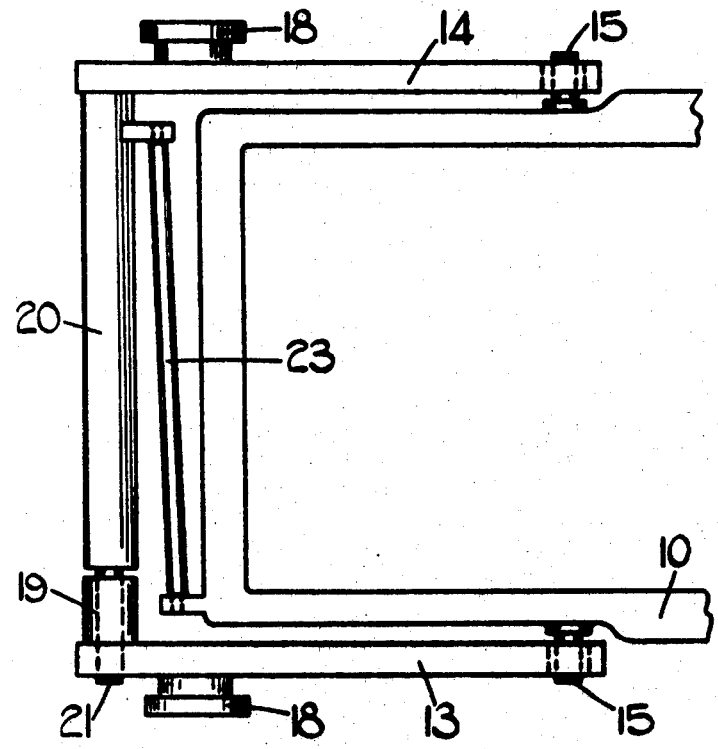
Figure 2:
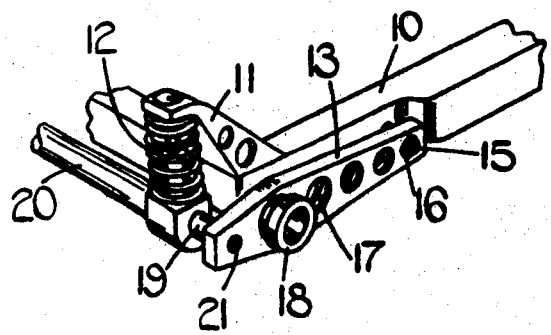
Figure 3:
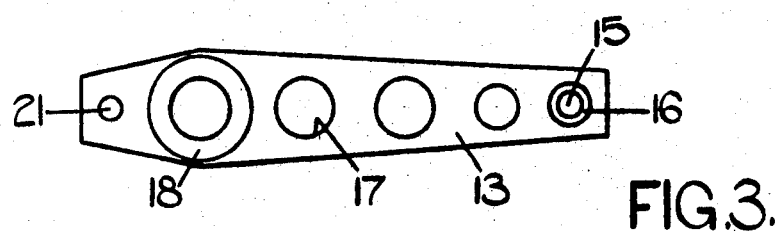

The invention will now be described by way of example with reference to the accompanying drawing in which, FIG. 1 is a plan view of a rear suspension system for a pair of rear wheels and constructed in accordance with the invention, FIG. 2 is a fragmentary perspective view of one corner of the suspension system and, FIG. 3 is a side elevation view of one of the arms of the system.

The rear suspension system illustrated is for a pair of rear wheels of a front wheel drive electric vehicle which is driven by an electric motor supplied from a number of batteries making up a battery pack.

The battery pack is located in a chassis of the vehicle identified at 10. The rear end of the chassis is an open rectangle and at the corners there are respective structures 11 (shown only in FIG. 2) which form the upper abutments for suspension springs 12.

Pivotally mounted to the two longitudinally extending members of the chassis 10 are respective radius arms 13, 14. These are positioned outside the respective members of the chassis 10 to which they are connected. The pivots are coaxial and are in the form of respective pins 15 engaging in bushes 16 in the radius arm ends.

Each radius arm as shown in FIG. 3 has lightening holes 17, and near the end opposite to the bushes 16 they carry respective hub plates 18. The hub plates 18 are coaxial flanged members adapted in a manner not shown to carry the two rear wheels of the vehicle.

The radius arms 13 and 14 extend beyond the hub plates 18 and their extremities are joined by a transverse member formed in two parts 19, 20 which are fixed to the radius arms 13, 14 respectively. The member formed of the two parts 19, 20 serves to connect the radius arms together. The parts 19, 20 thereof are pivotally joined at a position near to the radius arm 13 as shown in FIG. 1. The part 20 carries an extension 21 which passes through bushes formed in the part 19.

The parts 19, 20 carry respective brackets 22 one of which is shown in FIG. 2. This forms the support for the lower end of the suspension spring 12.

The arrangement is such that the radius arms 13, 14 may move independently of one another under the control of the respective springs 12 within limits determined by the pivotal connection at 21 of the member 19, 20.

To prevent float of the suspension assembly 13, 14, 19, 20 there is a rod 23 which connected the member 20 with the chassis 10. This rod is fixed in a bracket near the radius arm 14 whereas the opposite end of the rod is fixed to the chassis in a bracket at the corner nearest to the radius arm 13. The rod 23 is so mounted as to allow up and down movement of the suspension system without allowing lateral movement thereof in relation to the chassis.

This construction occupies minimum space in the vehicle and enables the chassis to provide maximum space for the battery pack.

It is however, to be understood that the suspension system may be applied to other forms of vehicle which do not include the battery pack. It is not only applicable to the rear suspension of a vehicle in which drive takes place through the front wheels but to a front suspension for a rear wheel drive vehicle. A vehicle of this sort to which the system may be applied is a dumper truck.

We claim:

1. A suspension system for a pair of vehicle rear wheels comprising a pair of elongate arms each having first and second opposite ends, means at a first end of each arm for pivotal connection of said arms to the frame of the vehicle so that the arms extend rearwardly of said pivotal connections, two wheel hubs carried by said arms respectively at positions to the rear of said first ends, and a member connecting said second ends of said arms together across the vehicle, said member incorporating a single pivotal joint which is capable of rotation about an axis lengthwise of said member, and the system further comprising springs arranged to act between said member and the vehicle frame.

2. A suspension system as claimed in claim 1 in which a restraining rod is arranged for connection between the member and the frame of the vehicle.

* * * * *